June 13, 1961   W. G. HILL   2,987,844
FISH LURE
Filed Feb. 24, 1959
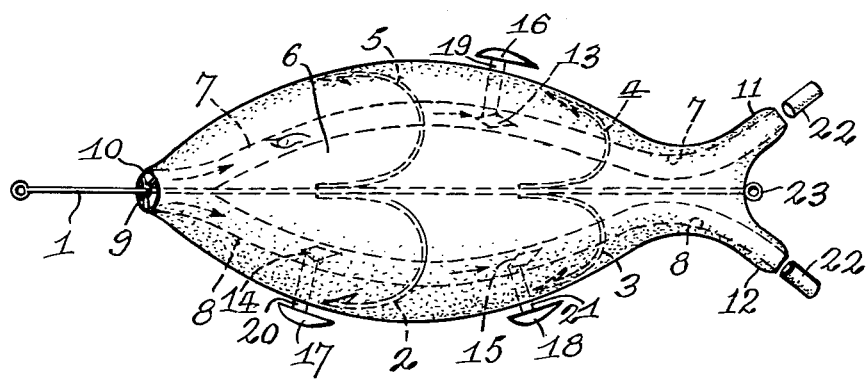
Inventor
W. G. Hill
By Glascock Downing Seebold
Attorneys 2,987,844
FISH LURE
Wilmot George Hill, 269 Raglan St., Renfrew,
Ontario, Canada
Filed Feb. 24, 1959, Ser. No. 794,883
Claims priority, application Canada Feb. 11, 1959
3 Claims. (Cl. 43—26.2)

The present invention relates to new and improved fishing lures or plugs.

It is an object of the invention to provide a fish plug which resembles a fish or other fish bait such as frogs, mice etc. and which simulates the action of a living creature when pulled through the water.

It is another object of the invention to provide a fishing plug wherein the hooks are wholly within the body of the lure where they are out of sight and protected from snagging on weeds, logs, etc.

It is still a further object of the invention to provide a lure having means for regulating its depth in the water when trolling or casting.

Another object is to provide a plug which is soft and pliable and not disagreeable to a fish's mouth.

An object of my invention is to provide a fish lure comprising in combination a central wire shaft, said shaft having means for the attachment of a fishing line, hooks attached to said shaft, a soft pliable body portion simulating a living creature moulded about said shaft and said hooks, a plurality of water channels running longitudinally through the body portion, water paddles positioned within said channels and in action-imparting relationship with fins positioned exteriorly with respect to said body portion.

Further objects of the invention will be apparent from the following description and in conjunction with the accompanying drawing wherein numeral 1 refers to a central flexible wire shaft to which hooks 2, 3, 4 and 5 are attached as shown. Four hooks are illustrated in the drawing but it is apparent that the number of hooks may be varied depending upon the size and shape of the fish plug desired.

Numeral 6 represents the main body portion of the plug which is made of a soft pliable compressive material such as foam-rubber, flexible plastic or the like. The hooks are normally embedded in the main body of the plug but when a fish bites on the plug the soft-pliable material compresses easily thus baring the hooks which engage the fish. When a hooked fish is removed from the plug the soft pliable body returns to its original shape thus again surrounding and hiding the hooks. This method of construction apart from concealing the hooks from the fish's view also enables the plug to be pulled through weeds and other obstacles without risk of entanglement.

The body of the plug 6 is provided with two longitudinal water channels 7 and 8 through which water flows as the plug is pulled through the water. Water enters these channels through the open mouth 9 of the fish held rigid by ring 10 and leaves by way of the tail extremities 11 and 12. Within these channels, paddles 13, 14 and 15 are positioned. These paddles are affixed to exterior fins 16, 17 and 18 respectively by rotatable shafts 19, 20 and 21 respectively which pierce the soft pliable body.

As the plug is pulled through the water, water enters the fish's mouth 9 and flows through the channels 7 and 8 thus activating the paddles 13, 14 and 15 in the channels which in turn activate the exterior fins 16, 17 and 18 by means of rotatable shafts 19, 20 and 21.

While it is preferred to have water channels running throughout the body of the plug it is obvious that the body of the plug may be completely hollow if so desired.

The movement of the fins resembles the action of the fins of a live fish thus the lure takes on a very lifelike appearance.

The water leaves the channels 7 and 8 by the tail extremities 11 and 12. The depth at which the lure rides in the water may be regulated by inserting solid or hollow cylindrical cork, plastic or metal plugs 22 into these tail openings.

The smaller the openings in the hollow plugs the smaller the volume of water which will pass through the water channels with the result that the amount of drag on the lure and the speed of the fin action can be regulated.

The lure also provides a ring 23 at the tail end of the wire shaft 1 to which additional hooks or feathers may be attached if so desired.

While the disclosure and attached drawing disclose a specific lure comprising four hooks, two water channels, three fins etc. it is within the scope of the invention that any number of combination of these may be employed.

I claim:

1. A fish lure comprising in combination a central flexible wire shaft, said shaft having means for the attachment of a fishing line thereto, fish hooks attached to said shaft, a soft pliable body portion simulating a living creature moulded about said shaft and said hooks, a plurality of water channels running longitudinally through the body portion, a plurality of shafts mounted in said body at spaced intervals in such a manner as to extend from the channels to the exterior surface thereof, water paddles positioned within said channels and mounted on said shafts at one end in action-imparting relationship, and fins positioned exteriorly with respect to said body portion on the free ends of said shafts.

2. A fish lure according to claim 1 wherein the rearward openings of said water channels are adapted to receive cylindrical plugs.

3. A fish lure comprising in combination a central flexible wire shaft, said shaft having means for the attachment of a fishing line thereto, fish hooks attached to said main shaft, a soft pliable body portion simulating a living creature moulded about said shafts and said hooks, a plurality of water channels running longitudinally through the body portion and having their forward openings communicating with the opened mouth of said creature, a plurality of shafts mounted in said body at spaced intervals in such a manner as to extend from the channels of the exterior surface thereof, water paddles positioned within said channels and mounted on said shaft at one end in action-imparting relationship, fins positioned exteriorly with respect to said body portion on the free ends of said shafts, and cylindrical plugs adapted to be received by the rearward openings of said water channels.

References Cited in the file of this patent
UNITED STATES PATENTS

| | | |
|---|---|---|
| 994,927 | Jefferson | June 13, 1911 |
| 1,609,855 | Bayer | Dec. 7, 1926 |
| 2,229,369 | Buettner | Jan. 21, 1941 |
| 2,511,138 | Wood | June 13, 1950 |
| 2,556,702 | Nielsen | June 12, 1951 |